US012732275B2

(12) United States Patent
Dobashi

(10) Patent No.: US 12,732,275 B2
(45) Date of Patent: Sep. 8, 2026

(54) OPTICAL REPEATER DEVICE AND RELAY METHOD

(71) Applicant: Kabushiki Kaisha Toshiba, Kawasaki (JP)

(72) Inventor: Kyosuke Dobashi, Tokyo (JP)

(73) Assignee: Kabushiki Kaisha Toshiba

( * ) Notice: Subject to any disclaimer, the term of this patent is extended or adjusted under 35 U.S.C. 154(b) by 165 days.

(21) Appl. No.: 18/735,617

(22) Filed: Jun. 6, 2024

(65) Prior Publication Data

US 2024/0322907 A1 Sep. 26, 2024

Related U.S. Application Data

(63) Continuation of application No. PCT/JP2022/045166, filed on Dec. 7, 2022.

(30) Foreign Application Priority Data

Dec. 9, 2021 (JP) ................................ 2021-200274

(51) Int. Cl.
*H04B 10/29* (2013.01)
*H04J 14/08* (2006.01)
(Continued)

(52) U.S. Cl.
CPC .............. *H04B 10/29* (2013.01); *H04J 14/08* (2013.01); *H04B 10/2575* (2013.01);
(Continued)

(58) Field of Classification Search
CPC ................ H04B 10/29; H04B 10/2575; H04B 10/25753; H04J 14/08; H04J 14/00;
(Continued)

(56) References Cited

U.S. PATENT DOCUMENTS 5,805,983 A * 9/1998 Naidu ...................... H01Q 3/26 455/503
8,310,963 B2 * 11/2012 Singh .................. H04B 7/2609 370/293

(Continued)

FOREIGN PATENT DOCUMENTS

JP 2008167141 A 7/2008
JP 2018186347 A 11/2018

(Continued)

OTHER PUBLICATIONS

5G Optical repeater equipment for measures against dead area of mobile terminals for communication, Social Systems Social Infrastructure Systems, Toshiba Review, vol. 76, No. 2, Mar. 2021, 3 pages (with translation).

*Primary Examiner* — Dibson J Sanchez
(74) *Attorney, Agent, or Firm* — Kim & Stewart LLP

(57) ABSTRACT

An optical repeater has signal processors which detect switching between uplink and downlink signals of a first group of connected base stations. A multiplexer/demultiplexer unit is between the signal processors and a first plurality of remote wireless units. A timing comparator acquires signal switching times for the first group of base stations, calculates adjustments for synchronizing the switching transmission of a downlink signal to a remote unit based on both internal switching times and external switching times for a second group of base stations connected to another optical repeater. A monitoring controller acquires detected delay amounts for a first plurality of remote units, and calculates timing adjustments for synchronizing transmissions from the first group of remote units and another group of remote units connected to the other optical repeater based on the detected delay amounts and information from the other optical repeater.

20 Claims, 5 Drawing Sheets

(51) Int. Cl.
*H04B 10/2575* (2013.01)
*H04J 14/00* (2006.01)
*H04Q 11/00* (2006.01)
*H04W 56/00* (2009.01)

(52) U.S. Cl.
CPC ......... *H04B 10/25753* (2013.01); *H04J 14/00* (2013.01); *H04Q 11/00* (2013.01); *H04Q 2011/0045* (2013.01); *H04W 56/00* (2013.01); *H04W 56/0045* (2013.01)

(58) Field of Classification Search
CPC .......... H04Q 11/00; H04Q 2011/0045; H04W 56/00; H04W 56/0045; H04W 16/26
USPC ... 398/43–103, 115–117, 140–172, 173–181
See application file for complete search history.

(56) References Cited

U.S. PATENT DOCUMENTS 8,743,718 B2 * 6/2014 Grenier ............... H04L 43/0864 370/252
8,897,839 B2 * 11/2014 Wang .................. H04W 56/004 455/562.1
9,036,486 B2 * 5/2015 Maca ..................... H04B 17/19 370/241
10,270,553 B2 * 4/2019 Shim ..................... H04W 56/00
10,644,741 B2 * 5/2020 Lida ......................... H04B 1/44
11,146,347 B2 * 10/2021 Ahn .......................... H04J 3/14
2007/0025316 A1 * 2/2007 Yamasaki ............. H04W 24/00 370/346
2008/0159337 A1 7/2008 Lee
2008/0159743 A1 * 7/2008 Lee ....................... H04J 3/0682 398/103
2008/0192855 A1 * 8/2008 Shapira .................... H04B 7/10 375/267
2010/0278530 A1 * 11/2010 Kummetz ........ H04B 10/25753 398/115
2011/0201368 A1 * 8/2011 Faccin ................. H04B 7/0413 455/507
2011/0243291 A1 * 10/2011 McAllister .............. H04L 7/033 375/376
2012/0177026 A1 * 7/2012 Uyehara .............. H04B 7/0413 370/345
2013/0188753 A1 * 7/2013 Tarlazzi .............. H04J 14/0298 375/299
2013/0308626 A1 * 11/2013 Feng ................ H04B 10/25753 370/350
2014/0243033 A1 * 8/2014 Wala ..................... H04W 24/00 455/517
2015/0249513 A1 * 9/2015 Schwab ................ H04L 5/1469 370/278
2016/0360500 A1 * 12/2016 Kim .................. H04W 56/0095
2017/0164404 A1 6/2017 Sundararajan
2018/0124729 A1 * 5/2018 Hanson ................. H04J 3/0682
2018/0152246 A1 * 5/2018 Cho .......................... H04L 5/14
2018/0309512 A1 10/2018 Doi
2018/0351647 A1 * 12/2018 Kawabata ............ H04B 10/272
2019/0028187 A1 * 1/2019 Gutman ............... H04B 7/2643
2019/0229798 A1 * 7/2019 Tango ................... H04W 24/02
2019/0319736 A1 * 10/2019 Hanson .............. H04Q 11/0005
2020/0162157 A1 * 5/2020 Kim ...................... H04J 3/0644
2020/0169975 A1 * 5/2020 Kwon ................... H04J 3/0638
2021/0029558 A1 * 1/2021 Jovanovic ............. H04W 24/02
2021/0314134 A1 * 10/2021 Sakuma ............... H04B 10/548

FOREIGN PATENT DOCUMENTS

JP 2018207238 A 12/2018
JP 6567438 B2 8/2019
JP 6602813 B2 11/2019
WO 2017095707 A1 6/2017
WO 2023106344 A1 6/2023

* cited by examiner

Fig. 3

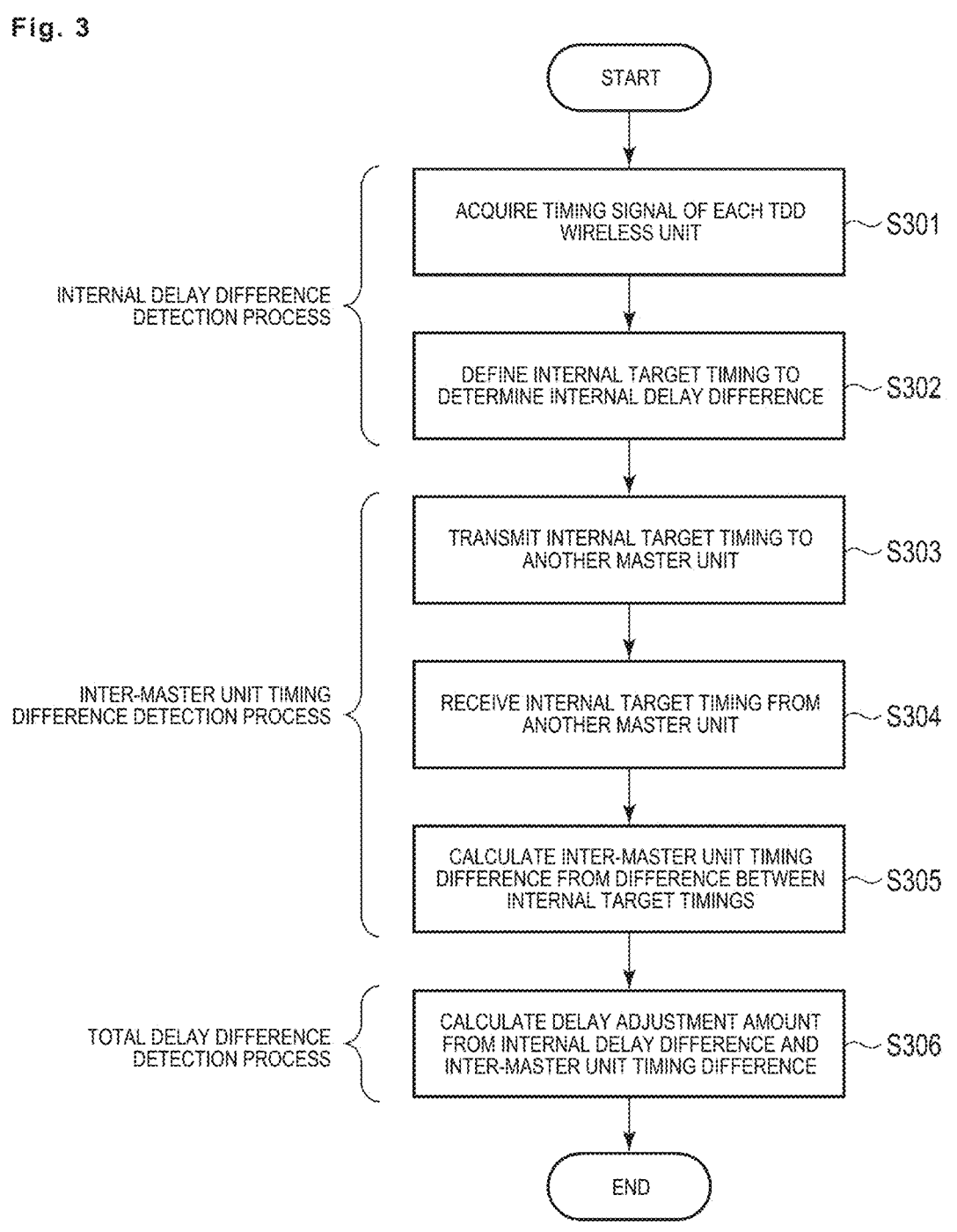

START

INTERNAL DELAY DIFFERENCE DETECTION PROCESS

ACQUIRE TIMING SIGNAL OF EACH TDD WIRELESS UNIT ~S301

DEFINE INTERNAL TARGET TIMING TO DETERMINE INTERNAL DELAY DIFFERENCE ~S302

INTER-MASTER UNIT TIMING DIFFERENCE DETECTION PROCESS

TRANSMIT INTERNAL TARGET TIMING TO ANOTHER MASTER UNIT ~S303

RECEIVE INTERNAL TARGET TIMING FROM ANOTHER MASTER UNIT ~S304

CALCULATE INTER-MASTER UNIT TIMING DIFFERENCE FROM DIFFERENCE BETWEEN INTERNAL TARGET TIMINGS ~S305

TOTAL DELAY DIFFERENCE DETECTION PROCESS

CALCULATE DELAY ADJUSTMENT AMOUNT FROM INTERNAL DELAY DIFFERENCE AND INTER-MASTER UNIT TIMING DIFFERENCE ~S306

END

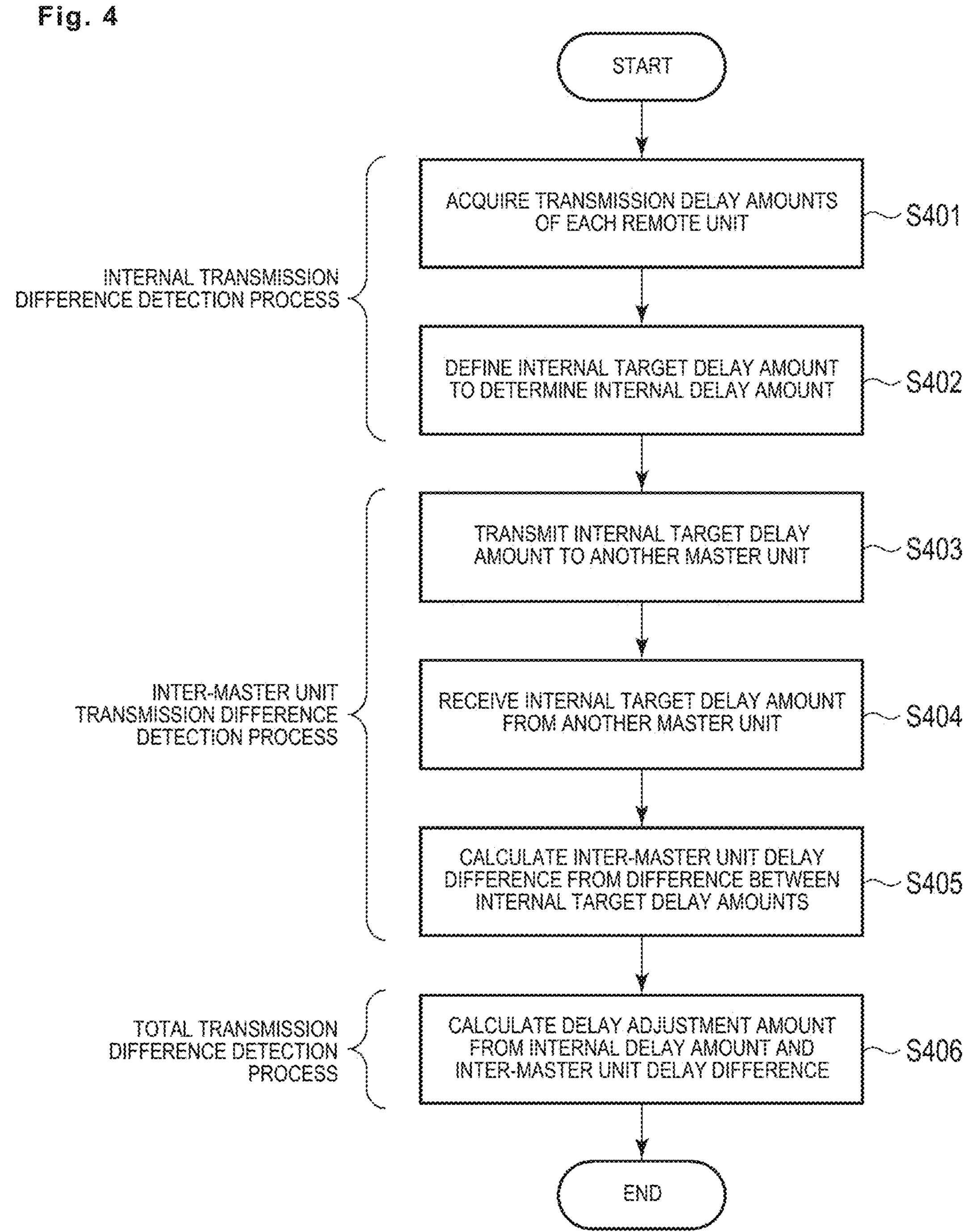
Fig. 4
START
ACQUIRE TRANSMISSION DELAY AMOUNTS OF EACH REMOTE UNIT
S401
DEFINE INTERNAL TARGET DELAY AMOUNT TO DETERMINE INTERNAL DELAY AMOUNT
S402
INTERNAL TRANSMISSION DIFFERENCE DETECTION PROCESS
TRANSMIT INTERNAL TARGET DELAY AMOUNT TO ANOTHER MASTER UNIT
S403
RECEIVE INTERNAL TARGET DELAY AMOUNT FROM ANOTHER MASTER UNIT
S404
CALCULATE INTER-MASTER UNIT DELAY DIFFERENCE FROM DIFFERENCE BETWEEN INTERNAL TARGET DELAY AMOUNTS
S405
INTER-MASTER UNIT TRANSMISSION DIFFERENCE DETECTION PROCESS
CALCULATE DELAY ADJUSTMENT AMOUNT FROM INTERNAL DELAY AMOUNT AND INTER-MASTER UNIT DELAY DIFFERENCE
S406
TOTAL TRANSMISSION DIFFERENCE DETECTION PROCESS
END

OPTICAL REPEATER DEVICE AND RELAY METHOD

CROSS-REFERENCE TO RELATED APPLICATIONS

This application is a continuation of PCT Application No. PCT/JP2022/045166, filed Dec. 7, 2022, based upon and claiming the benefit of priority from prior Japanese Patent Application No. 2021-200274, filed Dec. 9, 2021, the entire contents of which are incorporated herein by reference.

FIELD

Embodiments described herein relate generally to an optical repeater device and a relay method.

BACKGROUND

The service areas for fifth generation (5G) mobile communication systems are gradually expanding. An optical repeater system (also referred to as distributed antenna system (DAS)) can be introduced to eliminate dead spots, or the like, in a service coverage area. The optical repeater system can be useful for covering indoor areas such as large commercial facilities, office buildings, or the like.

An optical repeater system generally includes a master unit (MU) and a plurality of remote units (RU) which are connected to the master unit via an optical fiber. The master unit is in turn connected to a base station of a mobile communication network. The remote units are dispersed at a plurality of locations within an intended service area location. The service (coverage) area can be expanded by relaying radio waves received at the base station connected to the master unit between the master unit and the remote units.

A frequency division duplex (FDD) method or a time division duplex (TDD) method can be used for communication between the base station and a mobile communication terminal (also referred to as a mobile terminal). In a FDD method, different frequencies are used for an uplink (UL) and a downlink (DL). In a TDD method, one frequency is used but in a time division manner. In this context, carrier aggregation (CA) is a technology for improving communication speed by using multiple frequency bands in a time division manner at the same time.

With a 3GPP® protocol, the difference in switching timing between UL and DL is set to 3 μs or less between different frequency bands when applying carrier aggregation in a 5G TDD method. However, the protocol only refers to an output of the wireless signal of a base station and does not consider a wireless signal being transmitted and received by a remote station in an optical repeater system. In order to apply carrier aggregation, the switching timing of the UL and the DL between frequency bands is also required to be adjusted within a specified range for the output of the wireless signal of the remote station.

In recent years, it has become more common for multiple optical repeater systems to cover the same service area. In such cases, it is not sufficient for just the remote units within each of the optical repeater systems to be synchronized with each other, it is also required to adjust the UL/DL switching timing between frequency bands among all the remote stations present in the service area including those connected to another master unit.

BRIEF DESCRIPTION OF THE DRAWINGS

FIG. 3 is a flowchart of a processing procedure of a TDD timing comparator.

FIG. 4 is a flowchart of a processing procedure of a monitoring controller.

DETAILED DESCRIPTION

Figure 1:
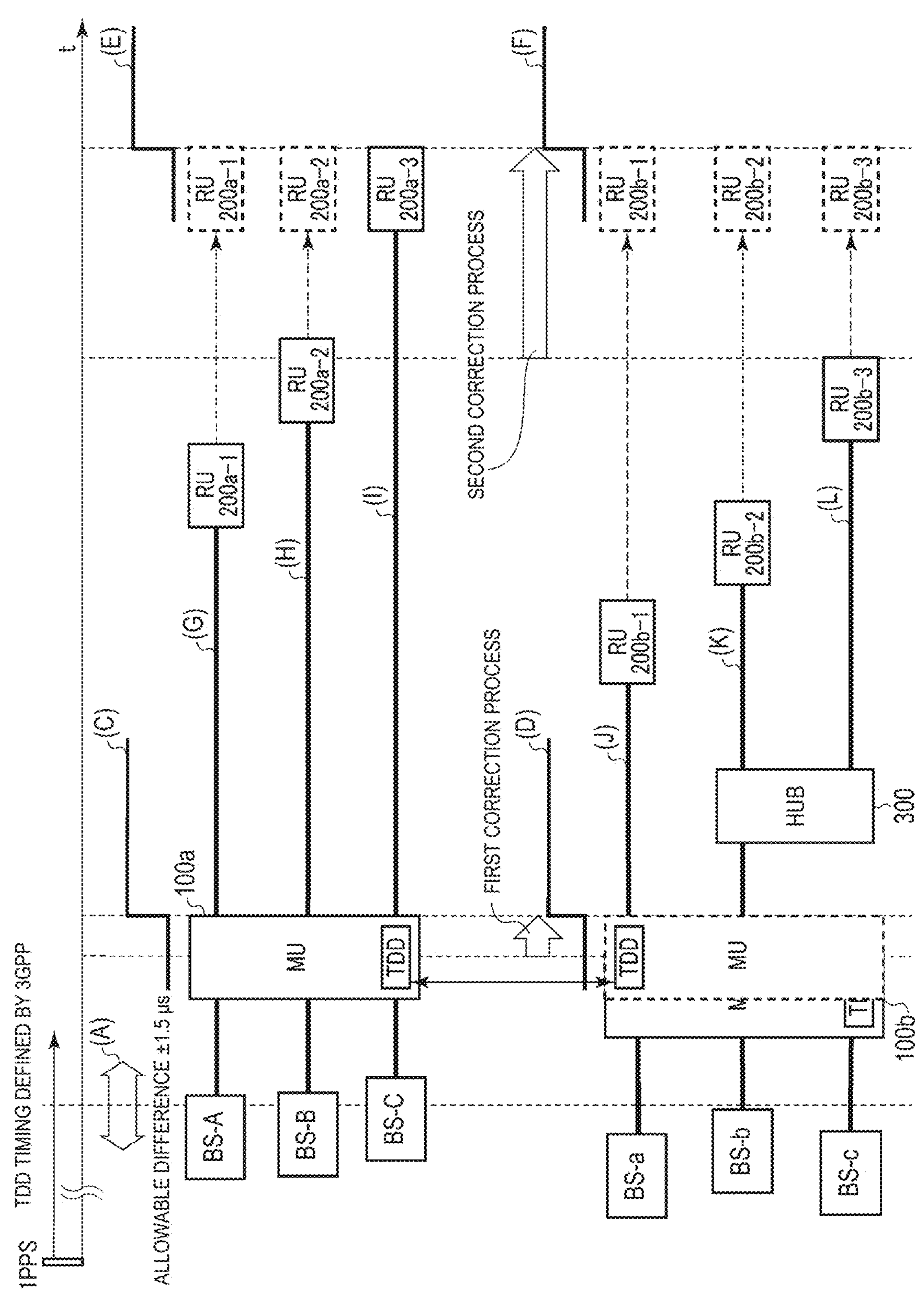
FIG. 1 is a diagram showing an example of an optical repeater system including an optical repeater device according to an embodiment.

Embodiments provide an optical repeater device and a relay method capable of synchronizing RF output of remote unit among multiple optical repeater systems in a common or overlapping service area.

According to one embodiment, an optical repeater device includes a plurality of signal processors. Each signal processor is configured to connect to one of a first plurality of base stations of a mobile communication network. Each signal processor detects a switching time between uplink and downlink signals of the connected base station. A multiplexer/demultiplexer unit of the optical repeater device is connected to the plurality of signal processors and configured to connect to a first plurality of remote units. The remote units are configured to wirelessly communicate with user terminals. A timing comparator of the optical repeater device is configured to acquire detected switching times from the plurality of signal processors for the first plurality of base stations, calculate adjustments for synchronizing the switching times to an internal switching time target for transmission of a downlink signal to a remote unit of the first plurality from the multiplexer/demultiplexer unit, acquire an external switching time target from a second optical repeater device for a second plurality of base stations connected to the second optical repeater device, and calculate adjustments for synchronizing the switching times to a switching time target set according to the internal switching time target and the external switching time target from the second optical repeater device. A monitoring controller of the optical repeater device is configured to acquire detected delay amounts for transmissions to the first plurality of remote units from the plurality of signal processors, calculate an internal target delay amount from the acquired detected delay amounts, acquire external target delay information from the second optical repeater for a second plurality of remote units connected to the second optical repeater, and calculate timing adjustments for synchronizing transmissions from the first and second plurality of remote units based on the detected delay amounts and the external target delay information.

An optical repeater device according to another embodiment includes a timing detector, a timing acquirer, and a synchronizer. The timing detector detects a switching timing of a downlink and an uplink for each of the plurality of base station devices. The timing acquirer acquires information related to a switching timing of a downlink and an uplink for a plurality of base station devices connected to another optical repeater device. The synchronizer synchronizes signals from a plurality of base station devices connected to the optical repeater device, based on switching timing detected by the timing detector and the information acquired by the timing acquirer.

Infrastructure sharing may be applied when 5G coverage is introduced to a service area. In this context, infrastructure sharing the sharing of a communication infrastructure among a plurality of different service providers. Typically, infrastructure sharing is adopted as a method of reducing costs. In a distributed antenna system (DAS), it may also be necessary to accommodate a plurality of base stations with different owners being connected to a single master unit. By applying this sharing technology to local 5G coverage, the same master unit may be shared by a communication service provider and one or more licensees. This type of shared (multi-user/provider) master unit is also referred to as a provider shared device.

Hereinafter, certain example embodiments will be described with reference to the drawings.

FIG. 1 is a diagram showing an example of an optical repeater system including an optical repeater device according to an embodiment. FIG. 1 also shows aspects of a correction method for a switching timing difference for UL/DL. The optical repeater system shown in FIG. 1 includes master units 100*a* and 100*b* each corresponding to an optical repeater device, remote units (RU) 200*a*-1 to 200*a*-3 and remote units (RU) 200*b*-1 to 200*b*-3, and a HUB 300.

In order to simplify the description, two master units (100*a*, 100*b*) are specifically depicted in FIG. 1, but a plurality of three or more or a single master unit may be used. Likewise, while each master unit (MU) is depicted as provided with three remote units (RU) (200*a*-1 to 200*a*-3, 200*b*-1 to 200*b*-3) any number of remote units (RU) may be adopted.

In the present example, master unit 100*a* is connected to TDD wireless units BS-A, BS-B, and BS-C via a coaxial cable. The TDD wireless units BS-A, BS-B, and BS-C are base station devices connected to a mobile communication network of a different communication service provider, for example. Similarly, the master unit 100*b* is connected to the TDD wireless units BS-a, BS-b, and BS-c, which are base station devices of a communication service provider, via coaxial cables. On the coaxial cable, four wireless signals, for example, can be transmitted in a 100 MHz band×4 (4×4 MIMO) for each base station (TDD wireless unit). The master unit 100*a* and the master unit 100*b* can be connected by, for example, a twisted pair cable.

In the following example, the TDD wireless units BS-A, BS-B, and BS-C are set to communicate wireless signals in different respective frequency bands fA, fB, and fC. The TDD wireless units BS-a, BS-b, and BS-c are also set to communicate wireless signals in different respective frequency bands fa, fb, and fc.

FIG. 1 shows that each of the master units 100*a* and 100*b* accommodates three TDD wireless units (BS-A, BS-B, and BS-C and BS-a, BS-b, and BS-c). The present embodiment is not limited to such a configuration.

Even when the TDD wireless units BS-A, BS-B, and BS-C are base station devices for the same communication service provider, the switching timing for UL and DL may still differ within a range of 3 μs (part A). Similarly, even when the TDD wireless units BS-a, BS-b, and BS-c are base station devices of the same communication service provider, the switching timing for UL and DL may still differ within a range of 3 μs (part A).

A switching timing difference in the UL/DL among the TDD wireless units BS-A, BS-B, and BS-C can be adjusted in the master unit 100*a*. A switching timing difference in the UL/DL among the TDD wireless units BS-a, BS-b, and BS-c can be adjusted in the master unit 100*b*.

A delay difference may also occur between the master unit 100*a* and the master unit 100*b* even after the switching timing difference is adjusted. The cause can be a difference in the accuracy of a Grand Master Clock (GMC), a deviation between an eNB (LTER base station) and a gNB (5G base station), or coaxial cable lengths for the master unit 100*a* and the master unit 100*b*.

It is necessary to eliminate the difference between a UL/DL switching timing (part C) of the master unit 100*a* and a UL/DL switching timing (part D) of the master unit 100*b*.

Therefore, in the present embodiment, the master unit 100*a* and the master unit 100*b* exchange information with each other, and in each master unit, a first correction process is performed based on substantially the same information, and the delay difference for each the connected TDD wireless units is corrected. This first correction process will be described below.

The master unit 100*a* accommodates (handles) the remote units 200*a*-1 to 200*a*-3. The master unit 100*a* and each of the remote units 200*a*-1 to 200*a*-3 are connected by an optical fiber, respectively. The data transmission rate of the optical fiber is, for example, 25 Gbps.

Similarly, the master unit 100*b* accommodates (handles) the remote units 200*b*-1 to 200*b*-3. The master unit 100*b* and the remote unit 200*b*-1 are directly connected by an optical fiber. The master unit 100*b* and the remote units 200*b*-2, 200*b*-3, however, are connected via the HUB 300. HUB 300 in turn is respectively connected to the remote units 200*b*-2, 200*b*-3 by an optical fiber. The data transmission rate of the optical fiber is, for example, 25 Gbps.

At the output points (transmission timing) for the master unit 100*a* to the remote units 200*a*-1 to 200*a*-3, even when the UL/DL switching timing is nominally synchronized, a UL/DL switching timing difference may still occur for the different remote units 200*a*-1 to 200*a*-3. The same applies for the remote units 200*b*-1 to 200*b*-3. This is because a transmission delay can be caused by a difference in the length of the optical fiber between the master unit and the remote unit, a processing delay difference in each device related to hardware differences, or the like.

The master unit 100*a* can adjust the UL/DL switching timing difference for each of the remote units 200*a*-1 to 200*a*-3. The master unit 100*b* can adjust the UL/DL switching timing difference for each of the remote units 200*b*-1 to 200*b*-3.

The master unit 100*a* can adjust the UL/DL switching timing difference caused by the transmission delay difference for each of the remote units 200*a*-1 to 200*a*-3. Similarly, the master unit 100*b* can adjust the switching timing difference of the UL/DL caused by the transmission delay difference for each of the remote units 200*b*-1 to 200*b*-3.

However, due to the transmission delay caused by the difference in the lengths of the optical fiber, the processing delay differences in each device, or the like, a delay difference in adjustment for a remote unit may now occur between the master unit 100*a* and the master unit 100*b*.

That is, it is necessary to eliminate the difference between a UL/DL switching timing (part E) of a remote unit under the master unit 100*a* and a UL/DL switching timing (part F) of a remote unit under the master unit 100*b*.

Therefore, in an embodiment, the master unit 100*a* and the master unit 100*b* exchange information with each other, and in each master unit, a second correction process is performed based on substantially the same information and a delay difference for respective remote units connected to each master unit is corrected. The second correction process will be described later.

If, in FIG. 1, the length of optical fiber (part G) between the master unit 100*a* and the remote unit 200*a*-1 is X (in kilometers (km)), the length of optical fiber (part H) between the master unit 100*a* and the remote unit 200*a*-2 is Y (in km), the length of optical fiber (part I) between the master unit 100*a* and the remote unit 200*a*-3 is Z (in km), the delay time generated in the master unit 100*a* is M (in microseconds (μs)), and the delay generated per unit length (per km) of the optical fiber is 5 (in μs), then delay times can be estimated as follows.

The delay time between the master unit 100*a* and the remote unit 200*a*-1 is estimated to be approximately (M+X×5) (in μs). The delay time between the master unit 100*a* and the remote unit 200*a*-2 is estimated to be approximately (M+Y×5) (in μs). The delay time between the master unit 100*a* and the remote unit 200*a*-3 is estimated to be approximately (M+Z×5) (in μs).

Furthermore, if the length of an optical fiber (part J) between the master unit 100*b* and the remote unit 200*b*-1 is x (in km), the length of an optical fiber (part K) between the master unit 100*b* and the remote unit 200*b*-2 is y (in km), the length of an optical fiber (part L) between the master unit 100*b* and the remote unit 200*b*-3 is denoted by z (in km), and the generated in the master unit 100*b* is m (in μs), then delay times can be estimated as follows.

The delay time between the master unit 100*b* and the remote unit 200*b*-1 is estimated to be approximately (m+x×5) (in μs). The delay time between the master unit 100*b* and the remote unit 200*b*-2 is estimated to be approximately (m+y×5) (in μs). The delay time between the master unit 100*b* and the remote unit 200*b*-3 is estimated to be approximately (m+z×5) (in μs).

In this way, due to the various different delays in a plurality of transmission sections, a deviation in UL/DL switching timing occurs in the air interface (wireless/fiberless connection) after the remote unit. Embodiments provide a technique capable of eliminating the deviation in the UL/DL switching timing.

Figure 2:
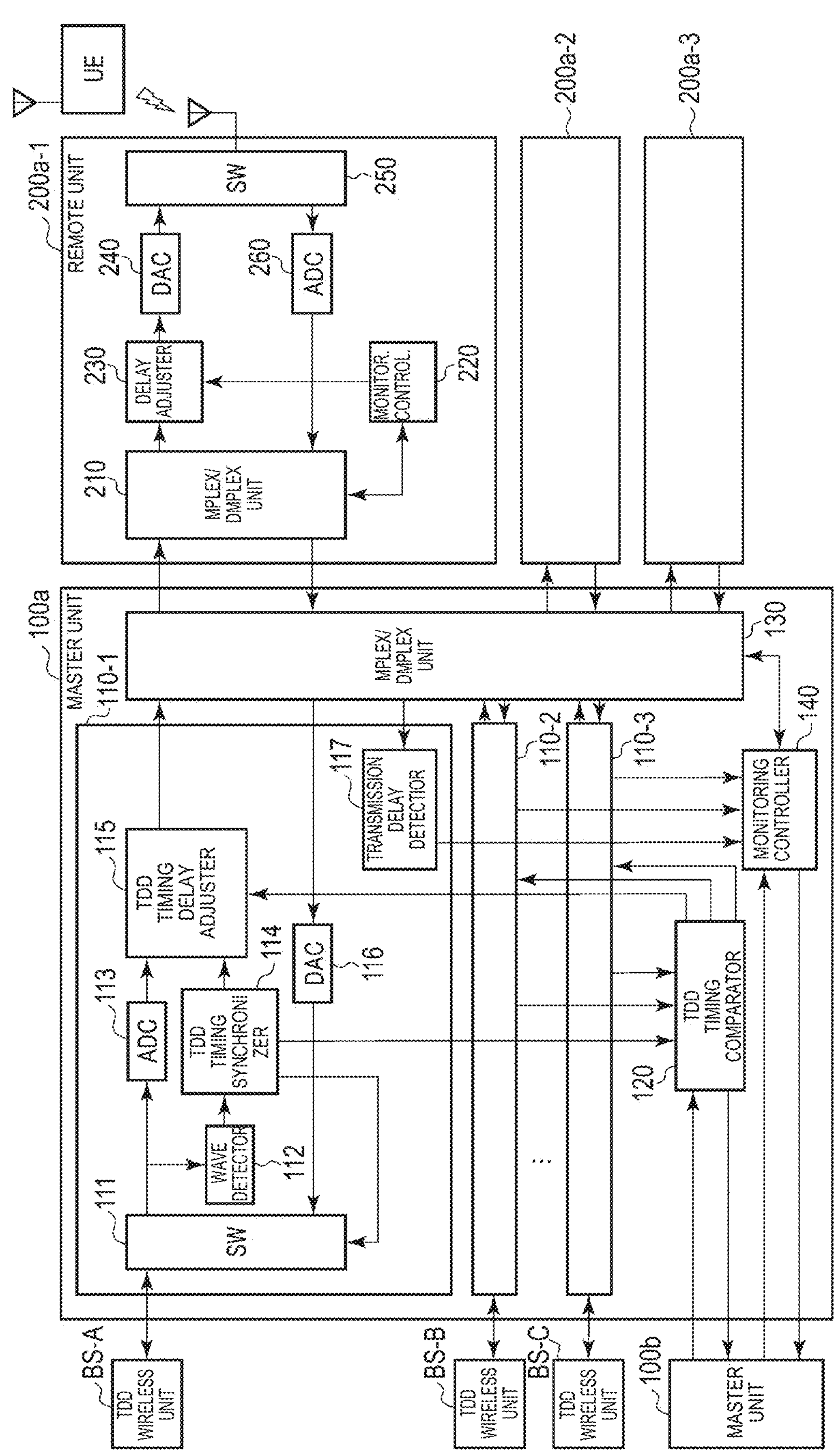
FIG. 2 is a block diagram showing an example of a master unit and a remote unit according to an embodiment.

FIG. 2 is a functional block diagram showing an example of a master unit (100*a*) and a remote unit (200*a*-1) according to the embodiment. The master unit 100*b* can be the same as the master unit 100*a*, and thus specific additional description of the master unit 100*b* is not necessary. Further, since the remote units 200*a*-2 to 200*a*-3 and 200*b*-1 to 200*b*-3 can be the same as the remote unit 200*a*-1, the specific additional description thereof is not necessary.

The master unit 100*a* includes signal processors 110-1 to 110-3, a TDD timing comparator 120, a multiplexing/demultiplexing unit 130, and a monitoring controller 140. For example, the TDD timing comparator 120 and the monitoring controller 140 may be configured as a processor and a memory. That is, these functional blocks (TDD timing comparator 120 and monitoring controller 140) may represent processing functions realized by one or more processors operating based on a program (software) and data stored in the memory.

The signal processors 110-1 to 110-3 are connected to the corresponding TDD wireless units BS-A, BS-B, and BS-C via coaxial cables, respectively. The signal processor 110-1 transmits and receives the wireless signal being communicated with a mobile terminal UE for the TDD wireless unit BS-A via a coaxial cable. The signal processor 110-2 transmits and receives the wireless signal being communicated with the mobile terminal UE for the TDD wireless unit BS-B via a coaxial cable. The signal processor 110-3 transmits and receives the wireless signal being communicated with the mobile terminal UE for the TDD wireless unit BS-C via a coaxial cable.

Each of the signal processors 110-1 to 110-3 includes a transmission/reception switching switch (SW) 111, a wave detector 112, an A/D converter (ADC) 113, a TDD timing synchronizer 114, a TDD timing delay adjuster 115, a D/A converter (DAC) 116 (digital/analog converter), and a transmission delay detector 117.

The signal processor 110-1 will be described. Since the configurations of the signal processors 110-1 to 110-3 can be the same, the following description can also serve as the description of the signal processors 110-2 and 110-3.

The transmission/reception switching switch 111 switches the transmission and reception times for the TDD wireless unit BS-A in synchronization with a timing signal provided by the TDD timing synchronizer 114. Thereby communication by a TDD method can be realized.

The TDD timing synchronizer 114 outputs a timing signal to the transmission/reception switching switch 111 to temporarily continue the reception of the downlink signal. Wave detection by the wave detector 112 is performed in synchronization with this timing. The wave detector 112 detects the switching between the uplink and the downlink by detecting the RF signal from the TDD wireless unit BS-A. The wave detector 112 and the TDD timing synchronizer 114 are examples of a timing detector.

That is, the signal processor 110-1 detects an analog waveform of the RF signal received by the wave detector 112 from the TDD wireless unit BS-A, and thus detects the switching timing (switching times) between the uplink and the downlink processes.

The A/D converter 113 down-converts the RF signal received from the TDD wireless unit BS-A to a baseband signal, converts the baseband signal to a digital signal, and outputs the digital signal to the TDD timing delay adjuster 115.

The TDD timing synchronizer 114 generates a timing signal (pulse signal) synchronized with the switching timing as detected by the wave detector 112, and outputs the timing signal to the transmission/reception switching switch 111 and the TDD timing comparator 120.

The TDD timing comparator 120 performs an internal delay difference detection process, an inter-master unit timing difference detection process, and a total delay difference detection process. The TDD timing comparator 120 is an example of a timing acquirer, a synchronizer (an internal delay detector and an external delay detector), and a timing information transmitter.

FIG. 3 is a flowchart showing an example of a processing procedure of a TDD timing comparator 120.

Internal Delay Difference Detection Process

In step S301, the TDD timing comparator 120 acquires the timing signals from each of the signal processors 110-1 to 110-3, respectively. That is, the TDD timing comparator 120 acquires the timing signals individually as detected for the TDD wireless units BS-A, BS-B, and BS-C by respective signal processors 110-1 to 110-3.

Next, in step S302, the TDD timing comparator 120 compares the three timing signals and calculates (detects or otherwise determines) internal delay amounts "DA," "DB," and "DC." Here, the internal delay amounts "DA," "DB," and "DC" are values used to correct the delay differences among the TDD wireless units BS-A, BS-B, and BS-C.

That is, the internal delay amounts "DA," "DB," and "DC" correspond to the adjustment amounts for the communication timings of the signal processors 110-1 to 110-3 such as used for synchronizing the switching timings for the signals from the TDD wireless units BS-A, BS-B, and BS-C to a reference timing.

For example, the switching timing of the TDD wireless unit that operates at the slowest switching timing (or the timing based on the switching timing) can be set as an internal target timing "T100A." The TDD timing comparator 120 calculates the difference between the internal target timing "T100A" and the timing signal detected by each of the signal processors 110-1 to 110-3 as the internal delay amounts "DA," "DB," and "DC." In the master unit 100*b* and the master unit 100*c*, corresponding internal target timing "T100B" and internal target timing "T100C" are also defined, separately.

(Inter-Master Unit Timing Difference Detection Process)

In step S303, the TDD timing comparator 120 notifies (transmits) the internal target timing "T100A" to another master unit 100*b*. Next, in step S304, the TDD timing comparator 120 detects (receives) the internal target timing "T100B" sent from the other master unit 100*b*.

Next, in step S305, the TDD timing comparator 120 calculates (detects or otherwise determines) an inter-master unit timing difference "D100." The inter-master unit timing difference "D100" is the difference between the internal target timing "T100A" and the internal target timing "T100B."

For example, the internal target timing of the master unit that operates at the slowest internal target timing (or the timing based on the internal target timing) can be set as a common target timing "S100." The TDD timing comparator 120 calculates or otherwise determines the difference between the common target timing "S100" and the internal target timing "T100A" as the inter-master unit timing difference "D100."

(Total Delay Difference Detection Process)

In step S306, the TDD timing comparator 120 obtains the delay adjustment amounts "DA100," "DB100," and "DC100" set based on the internal delay amounts "DA," "DB," and "DC" obtained in the internal delay difference detection process and the inter-master unit timing difference "D100" obtained in the inter-master unit timing difference detection process. The delay adjustment amount "DA100" is given to the signal processor 110-1 and is used to adjust the delay in the signal processor 110-1. The delay adjustment amount "DB100" is given to the signal processor 110-2 and is used to adjust the delay in the signal processor 110-2. The delay adjustment amount "DC100" is given to the signal processor 110-3 and is used to adjust the delay in the signal processor 110-3.

That is, the delay adjustment amounts "DA100," "DB100," and "DC100" are information to be used for correcting the delay differences for the TDD wireless units BS-A, BS-B, and BS-C of the master unit 100*a* and also the delay difference between the master unit 100*a* and the master unit 100*b*.

The TDD timing delay adjuster 115 delays the output of the A/D converter (ADC) 113 based on the delay adjustment amount "DA100" output from the TDD timing comparator 120 to account for the switching timing adjustments. Thereby, the first correction process shown in FIG. 1 is realized. The TDD timing delay adjuster 115 is an example of a synchronizer (delay adjuster).

The multiplexing/demultiplexing unit 130 multiplexes signals output from the TDD timing delay adjusters 115 of the signal processors 110-1 to 110-3 after converting the signals into optical signals, and transmits the multiplexed signals to the remote units 200*a*-1 to 200*a*-3 over the optical fibers.

The multiplexing/demultiplexing unit 130 also receives optical signals from each of the remote units 200*a*-1 to 200*a*-3 arriving via the optical fibers, photoelectrically converts these received optical signals, and extracts corresponding digital signals from the received optical signals. The digital signal is converted into an analog signal by the D/A converter (DAC) 116 and up-converted to a radio frequency. The thus obtained radio frequency signal is transmitted to the TDD wireless unit BS-A via the transmission/reception switching switch 111 and the coaxial cable.

The transmission delay detector 117, for example, transmits and receives a control (reference) signal for the remote unit 200*a*-1, and detects (identifies) the transmission delay amount between the master unit 100*a* and the remote unit 200*a*-1 based on this signal. Similarly, the transmission delay detector 117 of the signal processor 110-2 detects (identifies) the transmission delay amount between the master unit 100*a* and the remote unit 200*a*-2. The transmission delay detector 117 of the signal processor 110-3 detects (identifies) the transmission delay amount between the master unit 100*a* and the remote unit 200*a*-3. These transmission delay amounts are output to the monitoring controller 140. The transmission delay detector 117 is an example of a delay amount detector.

The monitoring controller 140 performs an internal transmission difference detection process, an inter-master unit transmission difference detection process, and a total transmission difference detection process. The monitoring controller 140 is an example of a delay amount acquirer, a synchronous controller (an internal delay detector, an external delay detector, and a delay information generator), and a delay information transmitter.

FIG. 4 is a flowchart showing an example of a processing procedure of the monitoring controller 140.

(Internal Transmission Difference Detection Process)

In step S401, the monitoring controller 140 acquires the individual transmission delay amounts from the signal processors 110-1 to 110-3. That is, the monitoring controller 140 acquires the transmission delay amount detected (calculated) for each of the remote units 200*a*-1 to 200*a*-3.

In step S402, the monitoring controller 140 compares the three transmission delay amounts and calculates (detects or otherwise determines) the internal delay amounts "D1," "D2," and "D3." The internal delay amounts "D1," "D2," and "D3" are used to correct the transmission delay difference between the master unit 100*a* and the remote units 200*a*-1 to 200*a*-3, respectively. That is, the internal delay amounts "D1," "D2," and "D3" correspond to the adjustment amounts to account for the transmission delays of the remote units 200*a*-1 to 200*a*-3 to permit matching of the delay amounts of the remote units 200*a*-1 to 200*a*-3 to a reference delay amount.

For example, the delay amount (or a delay value based on this) of the remote unit having the maximum delay (for example, the remote unit 200*a*-3 of FIG. 1) can be set as an internal target delay amount "T200A." The monitoring controller 140 calculates the difference between the internal target delay amount "T200A" and the transmission delay amount of each of the remote units 200*a*-1 to 200*a*-3 as the internal delay amounts "D1," "D2," and "D3."

(Inter-Master Unit Transmission Difference Detection Process)

In step S403, the monitoring controller 140 notifies (transmits) the internal target delay amount "T200A" to the other master unit 100*b*. In step S404, the monitoring control unit 140 receives the internal target delay amount "T200B" determined in the same manner for the master unit 100*b* from the master unit 100*b*. In step S405, the monitoring controller 140 calculates (detects or otherwise determines) the inter-master unit delay difference "D200" as the difference between the internal target delay amount "T200A" and the internal target delay amount "T200B."

In FIG. 1, the delay between the master unit 100*a* and the remote unit 200*a*-3 is shown as the maximum delay. For example, the internal target delay amount (or a delay amount based on this) of the master unit among the multiple master units having the maximum delay amount (e.g., master unit 100*a* to remote unit 200*a*-3 in FIG. 1) can be used as a common target delay amount "S200." The monitoring controller 140 calculates (or otherwise determines) the difference between the common target delay amount "S200" and its own internal target delay amount "T200A" as the inter-master unit delay difference "D200."

(Total Transmission Difference Detection Process)

In step S406, the monitoring controller 140 obtains the delay adjustment amount "D1200" based on the internal delay amount "D1" obtained in the internal transmission difference detection process and the inter-master unit delay difference "D200" obtained in the inter-master unit transmission difference detection process. The determined delay adjustment amount "D1200" is transmitted to the remote unit 200*a*-1 via the multiplexing/demultiplexing unit 130 and this delay adjustment amount "D1200" is used to adjust the transmission delay for the remote unit 200*a*-1 as appropriate.

The monitoring controller 140 also obtains a delay adjustment amount "D2200" based on the internal delay amount "D2" obtained by the internal transmission difference detection process and the inter-master unit delay difference "D200" obtained by the inter-master unit transmission difference detection process. The determined delay adjustment amount "D2200" is transmitted to the remote unit 200*a*-2 via the multiplexing/demultiplexing unit 130 and this delay adjustment amount "D2200" is used to adjust the transmission delay for the remote unit 200*a*-2 as appropriate.

The monitoring controller 140 further obtains a delay adjustment amount "D3200" based on the internal delay amount "D3" obtained by the internal transmission difference detection process and the inter-master unit delay difference "D200" obtained by the inter-master unit transmission difference detection process. The determined delay adjustment amount "D3200" is transmitted to the remote unit 200*a*-3 via the multiplexing/demultiplexing unit 130 and this delay adjustment amount "D3200" is used to adjust the transmission delay for the remote unit 200*a*-3 as appropriate.

That is, the delay adjustment amount "D1200" is information used for correcting both the difference in the individual transmission delay between the master unit 100*a* and the remote unit 200*a*-1 and the difference in the transmission delays of the master unit 100*a* and the master unit 100*b*.

The delay adjustment amount "D2200" is information used for correcting both the difference in the individual transmission delay between the master unit 100*a* and the remote unit 200*a*-2 and the differences in the transmission delays of the master unit 100*a* and the master unit 100*b*.

The delay adjustment amount "D3200" is information used for correcting both the difference in the individual transmission delay between the master unit 100*a* and the remote unit 200*a*-3 and the differences in the transmission delays of the master unit 100*a* and the master unit 100*b*.

The remote unit 200*a*-1 includes a multiplexing/demultiplexing unit 210, a monitoring controller 220, a delay adjuster 230, a D/A converter (DAC) 240 (digital/analog converter), a transmission/reception switching switch (SW) 250, and an A/D converter (ADC) 260 (analog/digital converter). The same description applies to the remote units 200*a*-2 and 200*a*-3. The remote unit 200*a*-1 will be described as representative.

The multiplexing/demultiplexing unit 210 separates the received multiplexed optical signals, converts the optical signals into electrical signals, and extracts a digital downlink signal.

The monitoring controller 220 detects a signal addressed to the remote unit 200*a*-1 in the downlink signal. The monitoring controller 220 also detects the delay adjustment amount "D1200" when transmitted from the master unit 100*a* and outputs the delay adjustment amount "D1200" to the delay adjuster 230.

The delay adjuster 230 outputs the downlink signal, for which the transmission timing has been appropriately delayed, to the D/A converter 240, based on the delay adjustment amount "D1200" from the monitoring controller 220. Thereby, the second correction process noted in FIG. 1 can be realized.

The D/A converter 240 converts a downlink signal into an analog signal and modulates a carrier wave as necessary. The modulated carrier wave is up-converted to a radio frequency, and then is radiated outward into a space via the transmission/reception switching switch 250 and the antenna.

The mobile terminal UE performs communication by controlling switching between transmitting and receiving (uplink/downlink) at a timing based on a wireless signal (downlink) received from the remote unit 200*a*-1. The RF signal transmitted from the mobile terminal UE is received via the antenna and sent to the transmission/reception switching switch 250 and then the A/D converter 260.

The A/D converter 260 down-converts the RF signal received from the mobile terminal UE to a baseband signal, A/D-converts the baseband signal, and outputs the digital baseband signal to the multiplexing/demultiplexing unit 210.

The multiplexing/demultiplexing unit 210 converts the digital signal output from the A/D converter 260 into an optical signal, multiplexes the optical signal, and transmits the multiplexed optical signal to the master unit 100*a* via an optical fiber.

As described above, the master unit 100*a* determines the internal target timing "T100A" by an internal delay difference detection process and identifies the delay amounts (internal delay amounts "DA," "DB," and "DC") for each of the TDD wireless units BS-A, BS-B, and BS-C. In addition, the master unit 100*a* determines the inter-master unit timing difference "D100" between the internal target timing "T100A" and the internal target timing "T100B" of the other master unit 100*b* by an inter-master unit timing difference detection process. Furthermore, the master unit 100*a* adjusts the switching timing between uplink (UL) and downlink (DL) of the master unit 100*a* to synchronize with all the relevant TDD wireless units (BS-A, BS-B, and BS-C, and BS-a, BS-b, and BS-c) by a total delay difference detection process.

As a result, according to the optical repeater system of an embodiment, the switching timing differences for the UL/DL between the TDD wireless units BS-A, BS-B, and BS-C and the TDD wireless units BS-a, BS-b, and BS-c can be corrected. Therefore, the synchronization of the UL/DL switching timing can be performed not only at the output (transmission) points to the remote units 200*a*-1 to 200*a*-3 under the master unit 100*a* but also at the output (transmission) points to the remote units 200*b*-1 to 200*b*-3 under the master unit 100*b*.

The synchronization process of the UL/DL switching timing in the master unit 100*a* (and also master unit 100*b*) can be considered as a process of detecting the UL/DL switching timing difference among all the relevant TDD wireless units (TDD wireless units BS-A, BS-B, and BS-C and the TDD wireless units BS-a, BS-b, and BS-c) and then adjusting the UL/DL switching timing to be synchronized for all the TDD wireless units. This will be understood by those of ordinary skill in the art.

The master unit 100*a* also determines the internal target delay amount "T200A" by an internal transmission difference detection process and identifies the transmission delay amount (internal delay amounts "D1," "D2," and "D3") for each of the remote units 200*a*-1 to 200*a*-3 connected thereto. In addition, the master unit 100*a* identifies the inter-master unit delay difference "D200" between the internal target delay amount "T200A" and the internal target delay amount "T200B" of the other master unit 100*b* by an inter-master unit transmission difference detection process. The master unit 100*a* adjusts the switching timing between UL and DL for the master unit 100*a* to be synchronized with all the relevant remote units (200*a*-1 to 200*a*-3 and 200*b*-1 to 200*b*-3) by a total transmission difference detection process.

Thereby, according to the optical repeater system of an embodiment, the switching timing difference for the UL/DL among the all the relevant remote units (remote units 200*a*-1 to 200*a*-3 and the remote units 200*b*-1 to 200*b*-3) can be corrected. Therefore, the synchronization of the UL/DL switching timing can be performed not only at the output point to the mobile terminal(s) UE from the remote units 200*a*-1 to 200*a*-3 under the master unit 100*a* but also at the output point to the mobile terminal(s) UE from the remote units 200*b*-1 to 200*b*-3 under the master unit 100*b*.

The synchronization process of the UL/DL switching timing in the master unit 100*a* (and also the master unit 100*b*) can also be considered to be a process of detecting (determining) the transmission delay amounts for the remote units 200*a*-1 to 200*a*-3 and the remote units 200*b*-1 to 200*b*-3 and adjusting the UL/DL switching timing to be synchronized for all the remote units. This will be understood by those of ordinary skill in the art.

An embodiment provides an optical repeater device and a relay method capable of synchronizing the RF output points of remote units operating among a plurality of optical repeater systems. As a result, a carrier aggregation in which different optical repeater devices are involved can be executed in some examples, and it is possible to construct an optical repeater system with further improved availability.

The disclosure is not limited to the above-described embodiments, and aspects of the embodiments may be modified as implemented without departing from the spirit of the present disclosure. In addition, various embodiments may be formed by appropriately combining aspects disclosed in the above-described example embodiments. For example, a configuration may be adopted, in which some of the aspects shown in ab embodiment are omitted and elements or aspects described for different embodiments may be appropriately combined or substituted with those of other embodiments.

In an example, an environment with two master units 100*a* and 100*b* is mainly described. But it will be easily understood that synchronization can be realized in the same or substantially similar manner even when three or more master units are present.

In an example, both the first correction process and the second correction process shown in FIG. 1 involve delays. Therefore, the timing of the RF signal downlink-transmitted from the remote units 200*a*-1 to 200*a*-3 may deviate from the timing defined by 3GPP® protocols. Therefore, in some other examples, the TDD timing may be advanced on the TDD wireless units BS-A to BS-C side in anticipation of the delays in the first correction process and/or the second correction process. In this way, it is possible to synchronize with a TDD timing defined by 3GPP® protocol standards at the radio frequency (RF) output points of the remote units 200*a*-1 to 200*a*-3.

The signal processing units 110-1 to 110-3 shown in FIG. 2 detect the switching between the uplink and the downlink from the analog waveform of the received RF signal. In other examples, the signal processors 110-1 to 110-3 may instead be configured as shown in FIG. 5.

Figure 5:
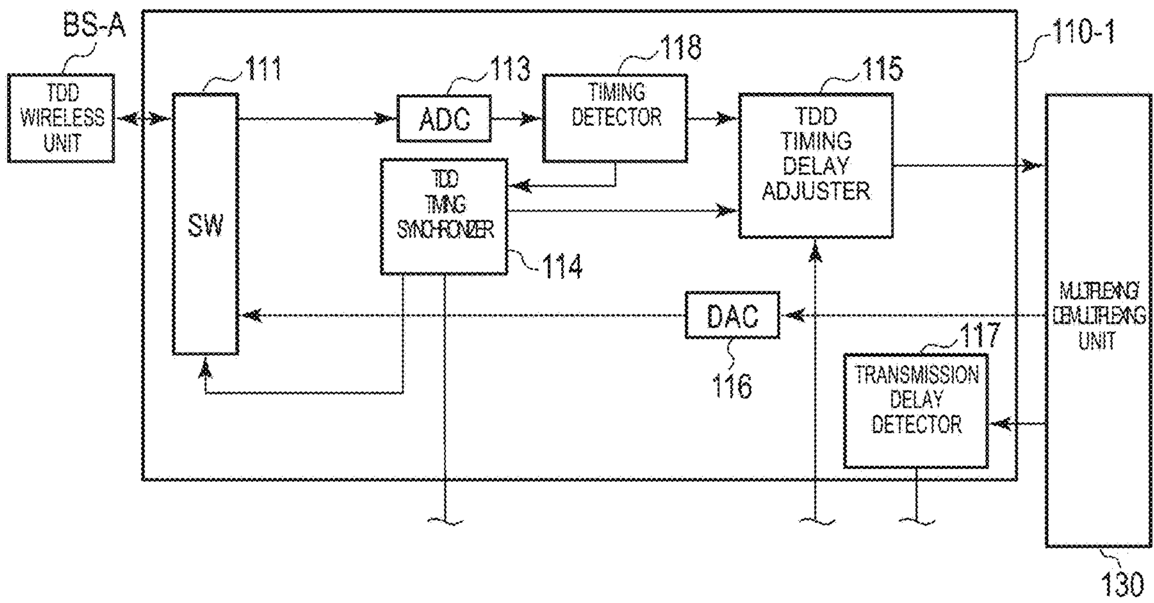
FIG. 5 is a block diagram showing another example of signal processors.

FIG. 5 is a functional block diagram showing another example of the signal processors 110-1 to 110-3. The signal processor 110-1 shown in FIG. 5 includes a timing detector 118 connected to after the A/D converter 113. The timing detector 118 detects (identifies) the switching timing (switch times) for the uplink and the downlink from the digital signal that has been obtained by digitally converting the received RF signal. That is, the timing detector 118 extracts the TDD timing by demodulating the digital signal and interpreting data included in the digital signal. In this way, the TDD timing may be detected (determined) from the signal after the signal has been converted into a digital signal.

The invention can be implemented with various modifications without departing from the spirit of the present disclosure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An optical repeater device, comprising:
   - a plurality of signal processors each configured to connect to one of a first plurality of base stations of a mobile communication network and detect a switching time between uplink and downlink signals of the connected base station;
   - a multiplexer/demultiplexer unit connected to the plurality of signal processors and configured to connect to a first plurality of remote units configured to wirelessly communicate with user terminals;
   - a timing comparator configured to:
     - acquire detected switching times from the plurality of signal processors for the first plurality of base stations, calculate adjustments for synchronizing the switching times to an internal switching time target for transmission of a downlink signal to a remote unit of the first plurality from the multiplexer/demultiplexer unit, acquire an external switching time target from a second optical repeater device for a second plurality of base stations connected to the second optical repeater device, and calculate adjustments for synchronizing the switching times to a switching time target set according to the internal switching time target and the external switching time target from the second optical repeater device; and a monitoring controller configured to:

acquire detected delay amounts for transmissions to the first plurality of remote units from the plurality of signal processors, calculate an internal target delay amount from the acquired detected delay amounts, acquire external target delay information from the second optical repeater device for a second plurality of remote units connected to the second optical repeater device, and calculate timing adjustments for synchronizing transmissions from the first and second plurality of remote units based on the detected delay amounts and the external target delay information.

2. The optical repeater device according to claim 1, wherein the timing comparator sets the internal switching time target based on the slowest detected switching time for the first plurality of base stations.

3. The optical repeater device according to claim 2, wherein the timing comparator calculates adjustments for switching times as a difference between the detected switching time for each of the first plurality of base stations and the internal switching time target.

4. The optical repeater device according to claim 3, wherein, when the external switching time target is slower than the internal switching time target, the switching time target is set to the external switching time target.

5. The optical repeater device according to claim 1, wherein the timing comparator is configured to cause information corresponding to the internal switching time target to be transmitted to the second optical repeater device.

6. The optical repeater device according to claim 1, wherein the monitoring controller is configured to cause information corresponding to the internal target delay amount to be transmitted to the second optical repeater device.

7. The optical repeater device according to claim 1, wherein the monitoring controller is configured to cause information corresponding to calculated timing adjustments to be transmitted to each of the first plurality of remote units via the multiplexer/demultiplexer unit.

8. The optical repeater device according to claim 1, wherein each of the plurality of signal processors is connected to the respective one of the first plurality of base stations by a coaxial cable.

9. The optical repeater device according to claim 1, wherein the multiplexer/demultiplexer unit is connected to the first plurality of remote units by optical fibers.

10. The optical repeater device according to claim 1, wherein each signal processor of the plurality of signal processors detects the switching time from an analog signal.

11. The optical repeater device according to claim 1, wherein each signal processor of the plurality of signal processors detects the switching time from a digital signal.

12. An optical repeater system, comprising:

a first optical repeater device connected to a first plurality of base stations of a mobile communication network and a first plurality of remote units for wireless communication with user terminals; and a second optical repeater device connected to a second plurality of base stations of a mobile communication network and a second plurality of remote units for wireless communication with user terminals, wherein the first optical repeater device includes:

a plurality of signal processors each configured to connect to one of the first plurality of base stations and detect a switching time between uplink and downlink signals of the connected base station;

a multiplexer/demultiplexer unit connected to the plurality of signal processors and configured to connect to the first plurality of remote units;

a timing comparator configured to:

acquire detected switching times from the plurality of signal processors for the first plurality of base stations, calculate adjustments for synchronizing the switching times to an internal switching time target for transmission of a downlink signal to a remote unit of the first plurality from the multiplexer/demultiplexer unit, acquire an external switching time target from the second optical repeater device for the second plurality of base stations, and calculate adjustments for synchronizing the switching times to a switching time target set according to the internal switching time target and the external switching time target; and a monitoring controller configured to:

acquire detected delay amounts for transmissions to the first plurality of remote units from the plurality of signal processors, calculate an internal target delay amount from the acquired detected delay amounts, acquire external target delay information from the second optical repeater device for the second plurality of remote units, and calculate timing adjustments for synchronizing transmissions from the first and second plurality of remote units based on the detected delay amounts and the external target delay information.

13. The optical repeater system according to claim 12, wherein the first and second optical repeater devices are connected by a twisted pair cable.

14. The optical repeater system according to claim 12, wherein at least two of the base stations of the first plurality of base stations are for different mobile communication providers.

15. The optical repeater system according to claim 12, wherein the first optical repeater device is connected to the first plurality of remote units by optical fiber.

16. The optical repeater system according to claim 12, wherein the monitoring controller is configured to cause information corresponding to the internal target delay amount to be transmitted to the second optical repeater device.

17. The optical repeater system according to claim 12, wherein each signal processor of the plurality of signal processors detects the switching time from an analog signal.

18. A method for an optical repeater systems, the method comprising:

acquire detected switching times from a plurality of signal processors for a first plurality of base stations connected to a first optical repeater device;

calculate adjustments for synchronizing the switching times to an internal switching time target for transmission of a downlink signal from the multiplexer/demultiplexer unit to a remote unit of a first plurality of remote units connected to the first optical repeater device;

acquire an external switching time target from a second optical repeater device for a second plurality of base stations connected to the second optical repeater device;

calculate adjustments for synchronizing the switching times to a switching time target set according to the internal switching time target and the external switching time target from the second optical repeater device;

acquire detected delay amounts for transmissions to the first plurality of remote units from the plurality of signal processors;

calculate an internal target delay amount from the acquired detected delay amounts;

acquire external target delay information from the second optical repeater device for a second plurality of remote units connected to the second optical repeater device; and calculate timing adjustments for synchronizing transmissions from the first and second plurality of remote units based on the detected delay amounts and the external target delay information.

19. The method according to claim 18, wherein the internal switching time target is set based on the slowest detected switching time for the first plurality of base stations.

20. The method according to claim 18, wherein, when the external switching time target is slower than the internal switching time target, the switching time target is set to the external switching time target.

* * * * *